(12) United States Patent
Fukushima et al.

(10) Patent No.: US 10,961,125 B2
(45) Date of Patent: Mar. 30, 2021

(54) SP² CARBON-CONTAINING COMPOSITION, GRAPHENE QUANTUM DOT-CONTAINING COMPOSITION, METHODS OF MANUFACTURING THEREOF, AND METHOD OF PEELING GRAPHITE

(71) Applicants: TOKYO INSTITUTE OF TECHNOLOGY, Tokyo (JP); NICHIA CORPORATION, Anan (JP)

(72) Inventors: Takanori Fukushima, Tokyo (JP); Yoshiaki Shoji, Tokyo (JP); Hiroaki Takahashi, Yokohama (JP)

(73) Assignees: TOKYO INSTITUTE OF TECHNOLOGY, Tokyo (JP); NICHIA CORPORATION, Anan (JP)

( * ) Notice: Subject to any disclaimer, the term of this patent is extended or adjusted under 35 U.S.C. 154(b) by 341 days.

(21) Appl. No.: 16/076,967

(22) PCT Filed: Feb. 15, 2017

(86) PCT No.: PCT/JP2017/005551
§ 371 (c)(1),
(2) Date: Aug. 9, 2018

(87) PCT Pub. No.: WO2017/141975
PCT Pub. Date: Aug. 24, 2017

(65) Prior Publication Data
US 2019/0047868 A1    Feb. 14, 2019

(30) Foreign Application Priority Data
Feb. 15, 2016    (JP) .............................. JP2016-026001

(51) Int. Cl.
*C01B 32/19*    (2017.01)
*C01B 32/225*    (2017.01)
(Continued)

(52) U.S. Cl.
CPC ............ *C01B 32/19* (2017.08); *C01B 32/194* (2017.08); *C01B 32/205* (2017.08);
(Continued)

(58) Field of Classification Search
CPC ..... C01B 32/19; C01B 32/205; C01B 32/194; C01B 32/225; C01B 32/182;
(Continued)

(56) References Cited

U.S. PATENT DOCUMENTS

2012/0261612 A1    10/2012   Suh et al.

FOREIGN PATENT DOCUMENTS

| JP | 2013514963 A | 5/2013 |
|----|--------------|--------|
| JP | 2015036389 A | 2/2015 |
| WO | 2012022513 A1 | 2/2012 |

OTHER PUBLICATIONS

Shoji, et al., A two-coordinate boron cation featuring C—B+—C bonding, Nature Chemistry 2014; 6: 498-503 (Year: 2014).*

(Continued)

*Primary Examiner* — Daniel C. McCracken
(74) *Attorney, Agent, or Firm* — Hunton Andrews Kurth LLP

(57) ABSTRACT

Provided are an sp² carbon-containing composition that is highly conductive and that excels in the stability of conductivity over time, a method of manufacturing the sp.sup.2 carbon-containing composition, and a method of peeling graphite to obtain a graphene-containing composition. Further provided are a graphene quantum dot-containing composition and a method of manufacturing the graphene quantum dot-containing composition that provides an improvement in the productivity and the manufacturing cost. A method of manufacturing an sp² carbon-containing composition according to the present disclosure includes a contact step of bringing a two-coordinate boron cation salt (Continued)

into contact with an sp.sup.2 carbon. Preferable examples of the two-coordinate boron cation include one expressed by the following formula (1). $R^1$—B—$R^2$ Formula (1) [In the formula, R.sup.1 and R.sup.2 are each independently a compound selected from the group consisting of a phenyl group, a mesityl group, 1,5-dimethylphenyl group, 1,3,5-triisopropylphenyl group, 1,5-diisopropylphenyl group, 1,3,5-tris(trifluoromethyl)phenyl group, and 1,5-bis(trifluoromethyl)phenyl group.]

16 Claims, 8 Drawing Sheets

(51) Int. Cl.
*C01B 32/205* (2017.01)
*C01B 32/194* (2017.01)
*B82Y 20/00* (2011.01)
*B82Y 30/00* (2011.01)
*B82Y 40/00* (2011.01)
*C08L 25/06* (2006.01)
*C08L 33/08* (2006.01)
*C08L 33/10* (2006.01)
*C08L 67/02* (2006.01)

(52) U.S. Cl.
CPC .............. *C01B 32/225* (2017.08); *B82Y 20/00* (2013.01); *B82Y 30/00* (2013.01); *B82Y 40/00* (2013.01); *C08L 25/06* (2013.01); *C08L 33/08* (2013.01); *C08L 33/10* (2013.01); *C08L 67/02* (2013.01)

(58) Field of Classification Search
CPC .............. C01B 32/198; C01B 2204/00; C01B 2204/20; C01B 2204/02; C01B 2204/04; C01B 2204/06; C01B 2204/065; C01B 2204/22; C01B 2204/24; C01B 2204/26; C01B 2204/28; C01B 2204/30; C01B 2204/32; C01B 32/20; C01B 32/21; C01B 32/215; C01B 32/22; C01B 32/23; B82Y 20/00; B82Y 30/00; B82Y 40/00; C08L 25/06; C08L 33/08; C08L 33/10; C08L 67/02

See application file for complete search history.

(56) References Cited

OTHER PUBLICATIONS

Matsumoto, M., et al. Ultrahigh-throughout exfoliation of graphite into pristine 'single-layer' graphene using microwaves and molecularly engineered ionic liquids, Nature Chemistry, vol. 7, (Sep. 2015), pp. 730-736.
Yu, P., et al. Electrochemical exfoliation of graphite and production of functional graphene, Current Opinion in Colloid & Interface Science, vol. 20, (2015), pp. 329-338.
Dong, Y., et al. One-step and high yield simultaneous preparation of single-and multi-layer graphene quantum dots from CX-72 carbon black, Journal of Materials Chemistry, vol. 22, (2012), pp. 8764-8766.
Pan, D., et al., Hydrothermal Route for Cutting Graphene Sheets into Blue-Luminescent Graphene Quantum Dots, Advanced Materials, vol. 22, (2010), pp. 734-738.
Shoji, Y. et al., A two-coordinate boron cation featuring C—B+—C bonding, Nature Chemistry, vol. 6, (Jun. 2014), pp. 498-503
Reed, C. A., H+, $CH_3$+, and $R_3$ Si+ Carborane Reagents: When Inflates Fail, Accounts of Chemical Research, vol. 43, No. 1, (Jan. 2010), pp. 121-128.
Lambert, J. B., Crystal Structure of a Silyl Cation with No Coordination to Anion and Distant Coordination to Solvent, vol. 260, (Jun. 25, 1993), pp. 1917-1918.
Japan Office Action issued to corresponding Japanese Patent Application No. 2018-500162 dated Jan. 12, 2021, 8 pages.

* cited by examiner

SP² CARBON-CONTAINING COMPOSITION, GRAPHENE QUANTUM DOT-CONTAINING COMPOSITION, METHODS OF MANUFACTURING THEREOF, AND METHOD OF PEELING GRAPHITE

CROSS-REFERENCE TO RELATED APPLICATION

This is a national phase application based on the PCT International Patent Application No. PCT/JP2017/005551 filed Feb. 15, 2017, claiming priority to Japanese Patent Application No. 2016-026001 filed Feb. 15, 2016, the entire contents of both of which are incorporated herein by reference.

TECHNICAL FIELD

The present disclosure relates to an $sp^2$ carbon-containing composition, a graphene quantum dot-containing composition, and methods of manufacturing the $sp^2$ carbon-containing composition and the graphene quantum dot-containing composition. The present disclosure further relates to a method of peeling graphite.

BACKGROUND ART

Graphene consists of a single layer having a two-dimensional structure in which carbon atoms are arrayed in a honeycomb shape, and graphite is a stack of graphene layers. Graphene and graphite excel in strength and conductivity. Thus, it is expected that graphene and graphite will be used in transparent conductive films, capacitors, electrodes for fuel cells, conductive complexes, solar cells, electrodes for storage batteries, electronic papers, transistors, various sensors, and so on.

To expand the application of graphene and graphite for such uses as described above, improvement in their conductivity is important. In one known method of improving the conductivity of graphene, it is doped with a one-electron oxidant (Patent Literature 1). According to the method disclosed in Patent Literature 1, a graphene sheet is exposed to a solution including a one-electron oxidant composed of triethyloxonium hexachloroantimonate to be doped therewith.

Although the manufacturing cost becomes an issue in regard to the use of graphene, a method of obtaining graphene by peeling graphite has been proposed (Non Patent Literatures 1 and 2). In addition, in one proposed method of manufacturing a graphene quantum dot (GQD), graphite is oxidized vigorously with nitric acid, sulfuric acid, or the like to synthesize graphene oxide; a hydrothermal synthesis is carried out thereafter; and graphene is micronized by cleaving epoxy chains to obtain a GQD (Non Patent Literatures 3 and 4). Non Patent Literatures 5 to 7 will be described later.

CITATION LIST

Patent Literature

Patent Literature 1: International Patent Publication No. WO2012/022513

Non Patent Literature

Non Patent Literature 1: Nature Chem. 2015, 7, 730-736.
Non Patent Literature 2: Review: Current Opinion in Colloid & Interface Science 2015, 20, 329-338
Non Patent Literature 3: J. Mater. Chem. 2012, 22, 8764-8766.
Non Patent Literature 4: D. Pan, J. Zhang, Z. Li, M. Wu, Adv. Mater. (2010) 22, 734.
Non Patent Literature 5: Nat. Chem. 2014, 6, 498-503.
Non Patent Literature 6: Acc. Chem. Res. 2010, 43, 121-128.
Non Patent Literature 7: Science. 1993, 260, 1917-1918.

SUMMARY OF INVENTION

Technical Problem

The conductivity of graphene or graphite can be improved through doping thereof. However, it has been difficult to sustain the effect of doping over time. In addition, the methods of manufacturing graphene disclosed in Non Patent Literatures 1 to 3 are disadvantageous in regard to productivity and manufacturing cost.

The present disclosure has been made in view of the background described above and is directed to providing an $sp^2$ carbon-containing composition that is highly conductive and that excels in the stability of conductivity over time and a method of manufacturing the $sp^2$ carbon-containing composition. The present disclosure is further directed to providing a method of peeling graphite to obtain a graphene-containing composition that is highly conductive and that excels in the stability of conductivity over time. Furthermore, the present disclosure is directed to providing a graphene quantum dot-containing composition and a method of manufacturing the graphene quantum dot-containing composition that provides an improvement in productivity and manufacturing cost.

Solution to Problem

The present inventors have conducted diligent studies and found that the problem of the present disclosure could be solved through the following embodiments, which led to the completion of the present disclosure.

[1]: A method of manufacturing an $sp^2$ carbon-containing composition, the method comprising:
  a contact step of bringing an $sp^2$ carbon and a two-coordinate boron cation salt into contact with each other,
  wherein the $sp^2$ carbon is at least one of graphene and graphite.

[2]: The method of manufacturing an $sp^2$ carbon-containing composition according to [1], wherein a two-coordinate boron cation of the two-coordinate boron cation salt is expressed by the following general formula (1).

[Chem. 1]

$$R^1\text{—}B\text{—}R^2 \qquad \text{Formula (1)}$$

[In the formula, $R^1$ and $R^2$ are each independently a compound selected from the group consisting of a phenyl group, a mesityl group, 1,5-dimethylphenyl group, 1,3,5-triisopropylphenyl group, 1,5-diisopropylphenyl group, 1,3,5-tris(trifluoromethyl)phenyl group, and 1,5-bis(trifluoromethyl)phenyl group.]

[3]: The method of manufacturing an $sp^2$ carbon-containing composition according to [1] or [2], wherein
  a counter anion of the two-coordinate boron cation salt includes at least one of a fluorine-based anion and a carborane derivative, the fluorine-based anion is at least one selected from the group consisting of $BF_4^-$, $PF_6^-$, TFSI, tetraphenyl borate, and tetrakis(pentafluorophenyl)borate, and the carborane derivative is at least one selected from the group consisting of monocarba-closo-dodecaborate ($HCB_{11}H_{11}^-$) and monocarba-closo-undecachlorododecaborate ($HCB_{11}Cl_{11}^-$).

[4]: The method of manufacturing an $sp^2$ carbon-containing composition according to any one of [1] to [3], wherein the contact step includes at least one selected from the steps of:

(i) forming, on a substrate, at least one of a layer consisting of the $sp^2$ carbon and a layer including the $sp^2$ carbon and bringing the two-coordinate boron cation salt into contact with the obtained layer;

(ii) mixing the $sp^2$ carbon or a composition including the $sp^2$ carbon with the two-coordinate boron cation salt in a solvent; and (iii) mixing the $sp^2$ carbon or powder including the $sp^2$ carbon with powder of the two-coordinate boron cation salt.

[5]: An $sp^2$ carbon-containing composition comprising:
an $sp^2$ carbon; and
a counter anion of a two-coordinate boron cation salt, wherein the $sp^2$ carbon includes at least one of graphene and graphite, the counter anion includes at least one of a fluorine-based anion and a carborane derivative, the fluorine-based anion is at least one selected from the group consisting of $BF_4^-$, $PF_6^-$, TFSI, tetraphenyl borate, and tetrakis(pentafluorophenyl)borate, and the carborane derivative is at least one selected from the group consisting of monocarba-closo-dodecaborate ($HCB_{11}H_{11}^-$) and monocarba-closo-undecachlorododecaborate ($HCB_{11}Cl_{11}^-$).

[6]: The $sp^2$ carbon-containing composition according to [5], further comprising a resin.

[7]: The $sp^2$ carbon-containing composition according to [5] or [6], wherein the $sp^2$ carbon is a lamina-shaped particle.

[8]: A method of peeling graphite to obtain a graphene-containing composition, the method comprising:
bringing a two-coordinate boron cation salt into contact with graphite.

[9]: The method of peeling graphite according to [8], wherein a two-coordinate boron cation of the two-coordinate boron cation salt is expressed by the following general formula (1).

[Chem. 2]

$$R^1\text{—}B\text{—}R^2 \qquad \text{Formula (1)}$$

[In the formula, $R^1$ and $R^2$ are each independently a compound selected from the group consisting of a phenyl group, a mesityl group, 1,5-dimethylphenyl group, 1,3,5-triisopropylphenyl group, 1,5-diisopropylphenyl group, 1,3,5-tris(trifluoromethyl)phenyl group, and 1,5-bis(trifluoromethyl)phenyl group.]

[10]: The method of peeling graphite according to [8] or [9], wherein
a counter anion of the two-coordinate boron cation salt includes at least one of a fluorine-based anion and a carborane derivative, the fluorine-based anion is at least one selected from the group consisting of $BF_4^-$, $PF_6^-$, TFSI, tetraphenyl borate, and tetrakis(pentafluorophenyl)borate, and the carborane derivative is at least one selected from the group consisting of monocarba-closo-dodecaborate ($HCB_{11}H_{11}^-$) and monocarba-closo-undecachlorododecaborate ($HCB_{11}Cl_{11}^-$).

[11]: The method of peeling graphite according to any one of [8] to [10], wherein the contact includes at least one selected from the steps of:

(i) forming, on a substrate, at least one of a layer consisting of the graphite and a layer including the graphite and bringing the two-coordinate boron cation salt into contact with the obtained layer;

(ii) mixing the graphite or a composition including the graphite with the two-coordinate boron cation salt in a solvent; and (iii) mixing the graphite or powder including the graphite with powder of the two-coordinate boron cation salt.

[12]: A method of manufacturing a graphene quantum dot-containing composition, the method comprising:
a step of dispersing and mixing a graphite particle and a two-coordinate boron cation salt in a solvent;
a residue-collecting step of collecting a residue through filtering following the step of dispersing; and
a step of redispersing the residue in a solvent to carry out size fractionation following the residue-collecting step.

[13]: The method of manufacturing a graphene quantum dot-containing composition according to [12], wherein a two-coordinate boron cation of the two-coordinate boron cation salt is expressed by the following general formula (1).

[Chem. 3]

$$R^1\text{—}B\text{—}R^2 \qquad \text{Formula (1)}$$

[In the formula, $R^1$ and $R^2$ are each independently a compound selected from the group consisting of a phenyl group, a mesityl group, 1,5-dimethylphenyl group, 1,3,5-triisopropylphenyl group, 1,5-diisopropylphenyl group, 1,3,5-tris(trifluoromethyl)phenyl group, and 1,5-bis(trifluoromethyl)phenyl group.]

[14]: The method of manufacturing a graphene quantum dot-containing composition according to [12] or [13], wherein
a counter anion of the two-coordinate boron cation salt includes at least one of a fluorine-based anion and a carborane derivative, the fluorine-based anion is at least one selected from the group consisting of $BF_4^-$, $PF_6^-$, TFSI, tetraphenyl borate, and tetrakis(pentafluorophenyl)borate, and the carborane derivative is at least one selected from the group consisting of monocarba-closo-dodecaborate ($HCB_{11}H_{11}^-$) and monocarba-closo-undecachlorododecaborate ($HCB_{11}Cl_{11}^-$).

[15]: A graphene quantum dot-containing composition comprising:
a graphene quantum dot; and
a counter anion of a two-coordinate boron cation salt, wherein
the counter anion includes at least one of a fluorine-based anion and a carborane derivative, the fluorine-based anion is at least one selected from the group consisting of $BF_4^-$, $PF_6^-$, TFSI, tetraphenyl borate, and tetrakis(pentafluorophenyl)borate, and the carborane derivative is at least one selected from the group consisting of monocarba-closo-dodecaborate ($HCB_{11}H_{11}^-$) and monocarba-closo-undecachlorododecaborate ($HCB_{11}Cl_{11}^-$).

[16]: The graphene quantum dot-containing composition according to [15], further comprising a resin.

Advantageous Effects of Invention

The present disclosure can deliver an excellent effect of providing an $sp^2$ carbon-containing composition that is highly conductive and that excels in the stability of conductivity over time and a method of manufacturing the $sp^2$ carbon-containing composition. The present disclosure can further deliver an excellent effect of providing a method of peeling graphite to obtain a graphene-containing composition that is highly conductive and that excels in the stability of conductivity over time. Furthermore, the present disclosure can deliver an excellent effect of providing a graphene quantum dot-containing composition and a method of manufacturing the graphene quantum dot-containing composition that provides an improvement in the productivity and the manufacturing cost.

DESCRIPTION OF EMBODIMENTS

Figure 1:
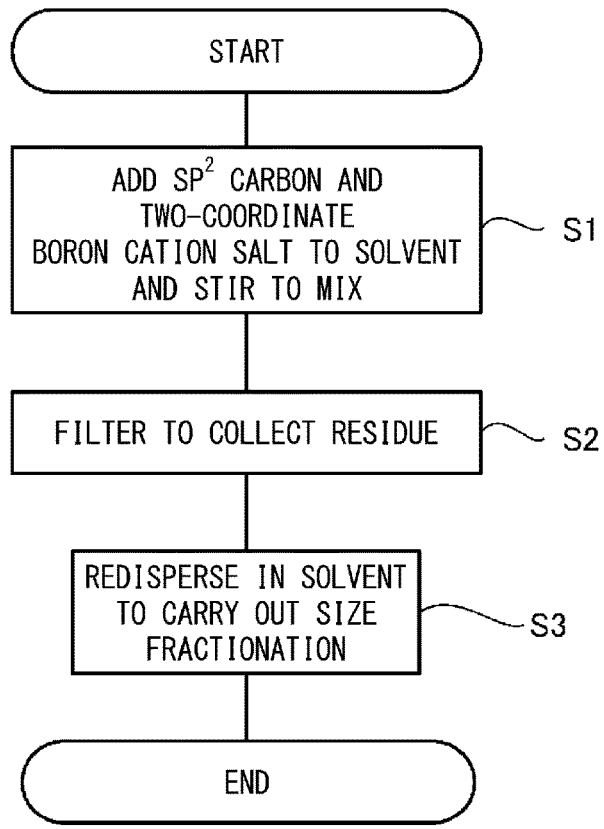
FIG. 1 is a flowchart illustrating an example of a method of manufacturing an $sp^2$ carbon-containing composition according to an embodiment.

Hereinafter, examples of embodiments to which the present disclosure is applied will be described. It is needless to say that other embodiments are also encompassed by the scope of the present disclosure as long as such embodiments coincide with the spirit of the present disclosure.

First Embodiment ($Sp^2$ Carbon-Containing Composition and Method of Manufacturing the $Sp^2$ Carbon-Containing Composition)

An $sp^2$ carbon-containing composition according to a first embodiment includes at least an $sp^2$ carbon and a counter anion of a two-coordinate boron cation salt. It is to be noted that the "$sp^2$ carbon-containing composition" does not include a graphene quantum dot-containing composition according to a third embodiment described later. Herein, that the $sp^2$ carbon-containing composition "does not include a graphene quantum dot-containing composition" means that a primary component of the $sp^2$ carbon in the $sp^2$ carbon-containing composition obtained through a method of manufacturing the $sp^2$ carbon-containing composition according to the first embodiment is not a graphene quantum dot. In other words, a graphene quantum dot-containing composition that could be included in a small amount inevitably or as a by-product in a process of manufacturing the $sp^2$ carbon-containing composition according to the first embodiment is not excluded. Herein, a primary component means an amount of no less than 90%. In addition, a graphene quantum dot refers to a nanoscale graphene crystal having unique optical characteristics that are in accordance with quantum chemistry or quantum mechanics. Such a graphene quantum dot can have a dimension of no greater than 20 nm in a plane direction of a crystal, for example. The dimension can be measured through, for example, dynamic light scattering (DLS) or observed directly with the use of atomic force microscopy (AFM) or transmission electron microscopy (TEM).

The $sp^2$ carbon is at least one of graphene and graphite. The $sp^2$ carbon may be a mixture of graphene and graphite. Examples of the shape of the $sp^2$ carbon can include a sheet and a lamina. A single layer sheet may be formed from the $sp^2$ carbon-containing composition, or the same type of layers or different types of layers of the $sp^2$ carbon-containing composition may be stacked together. In addition, a layer that is not of the $sp^2$ carbon-containing composition, such as a resin layer, a metal foil, or a metal thin film layer, may also be stacked.

The $sp^2$ carbon may be used in a particulate form. Examples of the particles can include nano powder and lamina-shaped particles, such as flake-shaped particles.

Graphene and graphite can be manufactured through a well-known method. Graphene can be manufactured, for example, through epitaxial growth, reduction of graphite oxide, production from metal-carbon melt, or the like. Commercially available graphene or graphite may also be used.

A method of manufacturing an $sp^2$ carbon-containing composition according to the first embodiment includes a contact step of bringing a two-coordinate boron cation salt into contact with an $sp^2$ carbon.

The two-coordinate boron cation salt is added to the $sp^2$ carbon as a dopant. A two-coordinate boron cation in the two-coordinate boron cation salt functions as a strong oxidant. In other words, when the two-coordinate boron cation salt is brought into contact with the $sp^2$ carbon, the two-coordinate boron cation in the two-coordinate boron cation salt functions as an oxidant for the $sp^2$ carbon, and a hole is formed in the $sp^2$ carbon. This makes it possible to reduce the resistance value of the $sp^2$ carbon and improve the conductivity. In addition, a counter anion of the two-coordinate boron cation salt exists as an anion counter around the sp² carbon having a hole formed therein. This makes it possible to improve the stability over time of the conductivity of the sp² carbon.

Although the two-coordinate boron cation is not particularly limited, preferable examples of the two-coordinate boron cation can include a group having, as a coordination group of the two-coordinate boron cation, at least one selected from the group consisting of a phenyl group, a mesityl group (1,3,5-trimethylphenyl group), 1,5-dimethylphenyl group, 1,3,5-triisopropylphenyl group, 1,5-diisopropylphenyl group, 1,3,5-tris(trifluoromethyl)phenyl group, and 1,5-bis(trifluoromethyl)phenyl group on at least one side.

Preferable examples of the two-coordinate boron cation include a compound expressed by the following general formula (1).

[Chem. 3]

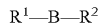

$$R^1-B-R^2 \qquad \text{Formula (1)}$$

In the formula, $R^1$ and $R^2$ are each independently a compound selected from the group consisting of a phenyl group, a mesityl group, 1,5-dimethylphenyl group, 1,3,5-triisopropylphenyl group, 1,5-diisopropylphenyl group, 1,3,5-tris(trifluoromethyl)phenyl group, and 1,5-bis(trifluoromethyl) phenyl group.

The counter anion that forms a salt with the two-coordinate boron cation is preferably at least one of a fluorine-based anion and a carborane derivative. Example of the fluorine-based anion can include at least one selected from the group consisting of $BF_4^-$, $PF_6^-$, TFSI, tetraphenyl borate, and tetrakis (pentafluorophenyl) borate. In addition, examples of the carborane derivative can include at least one selected from the group consisting of monocarba-closo-dodecaborate ($HCB_{11}H_{11}^-$) and monocarba-closo-undecachlorododecaborate ($HCB_{11}Cl_{11}^-$).

As a solvent in which the two-coordinate boron cation salt is dissolved, a solvent that does not react with a boron cation is used. For example, a nonpolar solvent, such as orthodichlorobenzene, 1,2,4-trichlorobenzene, or mesitylene, is preferable.

The two-coordinate boron cation salt can be synthesized, for example, with the use of the methods disclosed in Non Patent Literatures 5 to 7. For example, a dimesitylborinium ion $Mes_2B^+(HCB_{11}Cl_{11}^-)$ having, as a counter anion, monocarba-closo-undecachlorododecaborate expressed by the formula (2) can be synthesized through the following method.

[Chem. 4]

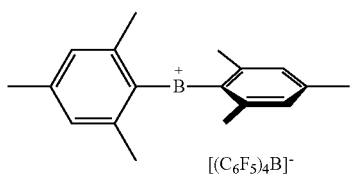

Formula (2)

$[(C_6F_5)_4B]^-$

In other words, fluorodimesitylborane is added to a dry orthodichlorobenzene solution of monocarba-closo-undecachlorododecaborate salt $[Et_3Si^+(HCB_{11}Cl_{11}^-)]$ (see Non Patent Literature 5) of a triethylsilyl cation at a room temperature in a glove box having each of the oxygen concentration and the water concentration controlled to no higher than 0.1 ppm under an argon or nitrogen atmosphere, and the mixture is stirred for 5 minutes at 25° C. Under reduced pressure, the reaction solution is distilled to be concentrated to approximately 0.5 mL. A hexane vapor is introduced into the obtained reaction mixture through vapor diffusion, and a colorless, transparent crystal is thus deposited. This crystal is collected through filtering and washed with dry hexane, and $[Mes_2B^+(HCB_{11}Cl_{11}^-)]$ is thus obtained as a colorless, transparent crystal.

In addition, with regard to a dimesitylborinium ion $Mes_2B^+[(C_6F_5)_4B^-]$ having, as a counter anion, tetrakis (pentafluorophenyl)borate, $Mes_2B^+[(C_6F_5)_4B^-]$ is obtained as a colorless, transparent crystal with the use of a mesitylene adduct (see Non Patent Literature 6) of $Et_3Si^+[(C_6F_5)_4B^-]$ in place of $Et_3Si^+(HCB_{11}Cl_{11}^-)$ through an operation similar to that in the case of $Mes_2B^+(HCB_{11}Cl_{11}^-)$.

As described above, the method of manufacturing the sp² carbon-containing composition according to the first embodiment includes the contact step of bringing the two-coordinate boron cation salt into contact with the sp² carbon. Graphene and graphite, serving as the sp² carbon, may each be used alone or may be used in combination. The contact step may be carried out through any method that allows the sp² carbon to be oxidized with the two-coordinate boron cation and that allows the counter anion of the two-coordinate boron cation salt to remain in the sp² carbon. Preferable examples include the following (i) to (iii).

(i) At least one of a layer consisting of the sp² carbon and a layer including the sp² carbon is formed on a substrate, and the two-coordinate boron cation salt is brought into contact with the obtained layer.

(ii) The sp² carbon or a composition including the sp² carbon is mixed with the two-coordinate boron cation salt in a solvent.

(iii) At least one of powder consisting of the sp² carbon and powder including the sp² carbon is mixed with powder of the two-coordinate boron cation salt.

These techniques may each be used alone or may be used in combination.

The method (i) described above, that is, the method involving forming a layer consisting of the sp² carbon or a layer including the sp² carbon (sp² carbon-containing composition that has not yet been doped) on a substrate and bringing the two-coordinate boron cation salt into contact with the formed layer is not particularly limited. In one method, for example, graphene is formed on a substrate through epitaxial growth or reduction of silicon carbide, and this substrate is coated with a solution obtained by dissolving the two-coordinate boron cation salt in a solvent through spin coating, dip coating, an inkjet technique, printing, spraying, a dispenser technique, or the like. In dip coating, for example, a solution of the two-coordinate boron cation salt (e.g., saturated solution of orthocyclorobenzene) is prepared, and the substrate having the graphene layer thereon is immersed in the solution (e.g., for one minute). This applies similarly to a graphite layer and a mixed layer of graphene and graphite.

When the two-coordinate boron cation salt is brought into contact with the sp² carbon, the two-coordinate boron cation functions as a strong oxidant, and a hole is formed in the sp² carbon. In association therewith, the counter anion of the two-coordinate boron cation salt functions as a counter anion of the sp² carbon. The two-coordinate boron cation which has been used as the oxidant can be removed easily along with the solution, but may be allowed to remain. In addition, a washing step may be added. The obtained coating is dried at a room temperature or heated to dry it. Through these steps, a film-shaped $sp^2$ carbon-containing composition film having a counter anion of the two-coordinate boron cation salt remaining in the layer is obtained.

A substrate is selected as appropriate from glass, silicon carbide, metal, resin, and so on in accordance with the purpose or the need. Glass is suitable in a case in which mechanical strength or transparency is required. The substrate is constituted by a single laminate or a plurality of laminates.

The method (ii) described above, that is, the method involving mixing the $sp^2$ carbon or a composition including the $sp^2$ carbon with the two-coordinate boron cation salt in a solvent to achieve a contact is not particularly limited, and for example the following method can be used. Commercially available graphene such as xGnP (registered trademark) from XG Sciences, Inc. is prepared as graphene, and this graphene is dissolved or suspended in a solvent. Examples of the solvent include orthodichlorobenzene. The two-coordinate boron cation salt is then added to the resultant solution or suspension and mixed. The doping concentration is not particularly limited and is, for example, 0.01 mM to 30 mM. Through these steps, an $sp^2$ carbon-containing composition doped with a counter anion of the two-coordinate boron cation salt is obtained. The obtained $sp^2$ carbon-containing composition can be formed into a film through coating or can be molded through injection molding, extrusion molding, or sheet forming. This applies similarly to graphite and a mixture of graphite and graphene.

With regard to the method (iii) described above, that is, the method involving mixing powder of the $sp^2$ carbon with powder of the two-coordinate boron cation salt, the stated powders may be mixed homogeneously with the use of a mixer. In this case, although the two-coordinate boron cation remains as a neutral compound upon oxidizing the $sp^2$ carbon, this does not affect the conductivity or its stability over time. If a step of dissolving in a solvent is carried out at the time of forming a thin film, a large portion of the two-coordinate boron cation is removed. The powder of the $sp^2$ carbon and the powder of the two-coordinate boron cation salt to be used may be subjected to airflow crushing or the like as necessary. In addition, when the powders are mixed, another compound may also be mixed therein, or the $sp^2$ carbon-containing composition that has not yet been doped but is already mixed with the $sp^2$ carbon or the like may be mixed with the two-coordinate boron cation salt.

Aside from the $sp^2$ carbon and the counter anion of the two-coordinate boron cation salt, other compounds can also be added to the $sp^2$ carbon-containing composition. Other compounds can be selected as appropriate in accordance with the purpose and the need. Suitable examples of other compounds include resin and a carbon material other than the $sp^2$ carbon (e.g., carbon black, Ketchen Black, milled carbon fiber). In addition, a dispersant, a defoamer, a plasticizer, an antioxidant, a binder, or the like may also be added to the said composition. Examples of the resin can include a thermoplastic resin and a thermosetting resin including a curable compound. In addition, a photosensitive resin and a conductive resin are also used suitably.

Suitable examples include a composite material consisting of a thermoplastic resin and the $sp^2$ carbon-containing composition including the $sp^2$ carbon and the counter anion of the two-coordinate boron cation salt and a composite material consisting of a conductive polymer and the $sp^2$ carbon-containing composition including the $sp^2$ carbon the counter anion of the two-coordinate boron cation salt.

Examples of the thermoplastic resin include (meth) acrylic polymer, polyolefin resin, polyamide resin, polystyrene, polycarbonate, polyethylene terephthalate, phenoxy resin, and a photosensitive resin.

In addition, to improve the impact resistance performance, a thermoplastic resin composition according to the first embodiment may contain another elastomer component. In addition, with a conductive polymer used as resin, the conductivity can be delivered through the synergy between graphene and/or graphite and the conductive polymer.

The content ratio between the resin and the $sp^2$ carbon-containing composition can be designed as appropriate in accordance with the needs. The content of the $sp^2$ carbon-containing composition with respect to that of the resin is 0.1 mass % to 95 mass %, for example.

According to the present disclosure, by doping the two-coordinate boron cation to the $sp^2$ carbon-containing composition, the resistance value can be reduced, and the $sp^2$ carbon-containing composition that is highly conductive and that excels in the stability of conductivity over time and a method of manufacturing the $sp^2$ carbon-containing composition can be provided. In addition, as the counter anion remains, the dispersiveness of the $sp^2$ carbon in the solvent or in the slurry can be improved.

The $sp^2$ carbon-containing composition can be suitably applied in transparent conductive films, capacitors, electrodes for fuel cells, carriers of electrode catalysts, conductive complexes, solar cells, electrodes of storage batteries such as lithium-ion batteries, electronic papers, transistors, various sensors, and so on. In addition, the $sp^2$ carbon-containing composition may be used in semiconductor layers of thin-film transistors or the like. Aside from the above, it is expected that the above composition will be used a broad range of other items, including sensors, actuators, construction materials, paints, $sp^2$ carbon-containing composition papers, and medical devices.

Second Embodiment (Method of Peeling Graphite)

A second embodiment relates to a method of peeling graphite to obtain a graphene-containing composition (excluding a graphene quantum dot-containing composition). Graphite, a two-coordinate boron cation salt, suitable solvents, additives, resin, intended use, and so on according to the second embodiment are similar to those of the first embodiment, and descriptions that are duplicate of those in the first embodiment are omitted hereinafter. In addition, the point that "a graphene quantum dot-containing composition is excluded" is applicable to the second embodiment as well as the first embodiment.

By bringing the two-coordinate boron cation salt into contact with graphite, single-layer, hole-doped graphene, that is, a graphene-containing composition including a counter anion and graphene can be obtained. For example, by adding and mixing the two-coordinate boron cation salt in a suspension of graphite with orthodichlorobenzene serving as a solvent, graphite can be peeled to obtain hole-doped graphene, that is, a graphene-containing composition including a counter anion and graphene. This conceivably occurs as graphite is oxidized with the two-coordinate boron cation to have a hole formed therein, which induces electrostatic repulsion in the graphite, enabling the graphite to be peeled.

In some effective methods of obtaining hole-doped graphene from graphite, the concentration of the two-coordinate boron cation salt is increased, or ultrasonication is used in combination.

With the method of peeling graphite according to the second embodiment, the manufacturing cost of graphene can be reduced. Furthermore, since graphene is hole-doped, high conductivity can be achieved. In addition, since the counter anion of the two-coordinate boron cation salt is incorporated around hole-doped graphene, the graphene excels in the stability of conductivity over time.

Third Embodiment (Graphene Quantum Dot-Containing Composition and Method of Manufacturing the Graphene Quantum Dot-Containing Composition)

A third embodiment relates to a graphene quantum dot-containing composition and a method of manufacturing the graphene quantum dot-containing composition. The method of manufacturing the graphene quantum dot-containing composition includes a step of mixing and dispersing the graphite particle and the two-coordinate boron cation salt in a solvent, a residue-collecting step of collecting a residue through filtering following the mixing step, and a step of redispersing the residue in a solvent to carry out size fractionation following the residue-collecting step. Graphite, the two-coordinate boron cation salt, suitable solvents, additives, resin, intended use, and so on according to the third embodiment are similar to those of the first embodiment, and descriptions that are duplicate of those in the first embodiment are omitted hereinafter.

An example of a suitable method of manufacturing a graphene quantum dot-containing composition will be described with reference to FIG. 1. First, graphite particles and a two-coordinate boron cation salt are prepared, and the graphite particles and the two-coordinate boron cation salt are added to a solvent, which is then stirred to be mixed and dispersed (step 1). Suitable examples of the graphite particles include carbon black, carbon fiber, synthetic graphite, and scaly graphite. From the viewpoint of obtaining the GQD-containing composition efficiently, graphite particles having a mean particle size of no greater than 10 μm are preferably used. The mean particle size is more preferably from 10 nm to 500 nm and even more preferably from 10 nm to 50 nm. The condition in which the stirring for mixing takes place can be selected as appropriate as long as the doping particles are mixed uniformly in the graphite particles. For example, the stirring is carried out for 2 hours to 72 hours. Examples of the solvent can include o-dichlorobenzene. The doping amount of the two-coordinate boron cation salt is, for example, approximately 300 to 600 parts by mass with respect to 100 parts by mass of the graphite particles. At the time of stirring, external energy is applied to facilitate the peeling and the micronization of the graphite particles. Suitable examples of the external energy include microwave irradiation, ultrasonic wave irradiation, and heating.

After the mixture is stirred sufficiently, the mixture is filtered to collect a residue (step 2). Suitable examples of a filter to be used to collect the residue include a Teflon (registered trademark) membrane filter. An optimum pore size is selected in accordance with the intended use. Typically, after being collected through filtering, the residue is washed with a favorable solvent, such as o-dichlorobenzene. Through these steps, the solvent is distilled to obtain a composition in which a GQD, graphene, and downsized graphite are each hole-doped and the counter anion of the two-coordinate boron cation salt is coordinated.

After step 2 is carried out, the composition is further redispersed in an appropriate solvent to carry out size fractionation (step 3). The solvent used in this process may be the same as or different from the solvent used in step 1. The size fractionation can be carried out as appropriate through a well-known method. In one example of a suitable method, centrifugal separation is carried out, and the supernatant liquid obtained by the centrifugal separation is subjected to chromatography, dialysis, ultrafiltration, ultracentrifugal separation, and so on. The size fractionation includes, aside from a mode of fractionating by the size of the volume, a mode of fractionating by mass and a mode of fractionating by divided molecular weight ranges.

A graphite-containing composition or a graphene-containing composition having a two-coordinate boron cation salt is obtained from a by-product such as a deposit or coarse particles having a relatively large particle size obtained through the size fractionation in step 3. The graphite-containing composition or the graphene-containing composition is suitable, for example, for electrode materials of batteries or the like, capacitor electrodes, and electronic materials such as carriers for electrode catalysts. Of course, graphene including a GQD can also be applied for such intended use.

In one suitable method of obtaining a hole-doped GQD efficiently from graphite, in the stirring step of step 1, the concentration of the two-coordinate boron cation salt is increased, or the intensity of external energy, such as ultrasonication, microwaves, and/or heating, is increased.

The methods of manufacturing GQDs described in the foregoing Non Patent Literatures 3 and 4 suffer from a disadvantage in that the process is long and the synthesis involves much work. In addition, oxidization with nitric acid, sulfuric acid, or the like causes O, COOH, OH, or the like to be mandatorily added as a functional group. A functional group has a large effect on the characteristics of GQDs, and this is not desirable when providing these functional groups is not appropriate.

In contrast, with the method of peeling graphite according to the present embodiment, the process can be reduced as compared to the methods disclosed in Non Patent Literatures 3 and 4. In addition, the two-coordinate boron cation strongly pulls out an electron of graphite and charges the graphite positively to peel graphene therefrom, and thus the manufacturing process is simple. Furthermore, nitric acid or sulfuric acid is not used in the manufacturing process, and thus O, COOH, OH, or the like is not added as a functional group. This makes it easier to add a functional group under a controlled state, and the design flexibility is high. In addition, in the stirring step, the presence and the intensity of the external energy can be adjusted with ease, and the GQD-containing composition can be manufactured with ease through reseparation following the centrifugal separation.

With the method of peeling graphite according to the third embodiment, the manufacturing cost of the GQD can be reduced. Furthermore, since the GQD is hole-doped, high conductivity can be achieved. In addition, since the counter anion of the two-coordinate boron cation salt is incorporated around the hole-doped GQD, the GQD excels in the stability of conductivity over time. There is also an advantage in that graphite or graphene other than the GQD obtained as a by-product can have an increased surface area as compared to graphite serving as a raw material substance. In addition, in association therewith, the conductivity of graphite or graphene other than the GQD can be increased. Furthermore, since the surface area is increased tremendously, the adsorption efficiency onto the GQD, graphene other than the GQD, and graphite can be increased effectively.

EXAMPLES

Hereinafter, the present disclosure will be described in further detail through examples. It is to be noted that the present disclosure is by no means limited by the following examples.

Example 1

Figure 2:
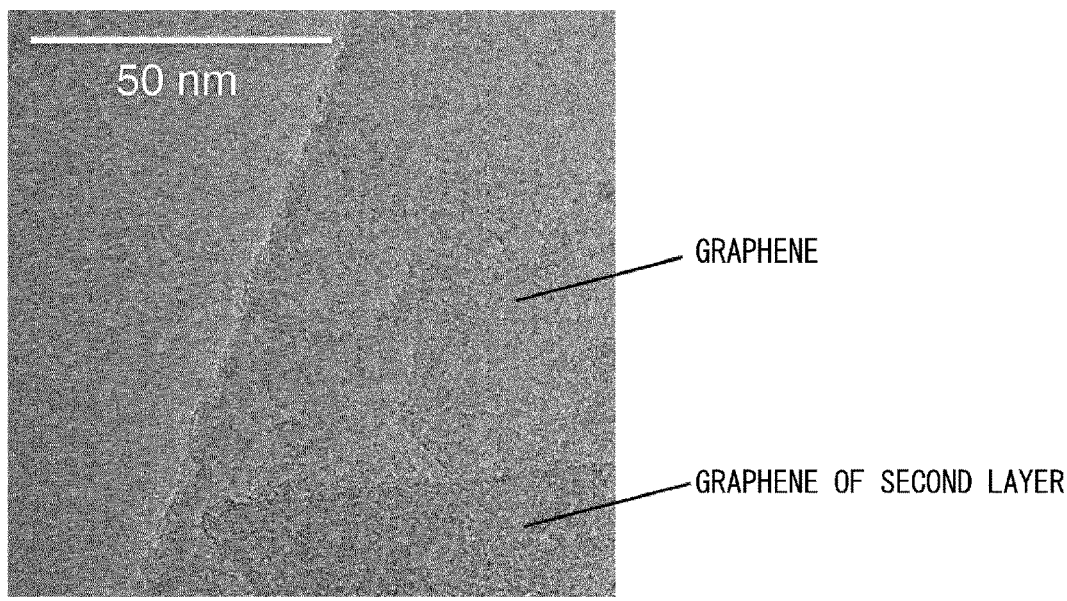
FIG. 2 illustrates a TEM image of a layer consisting of an $sp^2$ carbon-containing composition according to Example 1.

Under argon, dry orthodichlorobenzene (ODCB, 0.5 mL) was added to a small piece (5 mg) of Highly Oriented Pyrolytic Graphite (HOPG, illustrative product from Techno Chemics, Inc.) in a glove box having an oxygen concentration adjusted to no greater than 1.0 ppm, and the mixture was stirred. Powder of Mes2B$^+$[(C$_6$F$_5$)4B]$^-$ (30 mg), or the two-coordinate boron cation salt, was added to the above mixture, and the mixture was stirred for 24 hours at 25° C. Before the two-coordinate boron cation salt was added, HOPG remained solid in ODCB, but the dispersiveness improved dramatically after the two-coordinate boron cation salt was added. A portion of the obtained suspension was collected, and its sample placed dropwise on a carbon grid was observed with a transmission electron microscope. As a result, as illustrated in FIG. 2, it was confirmed that graphite was peeled and hole-doped graphene, that is, a graphene-containing composition was obtained.

Example 2

Under argon, 1 mL of dry orthodichlorobenzene was added to 15 mg of scaly graphite (mean particle size of 7 μm) at a room temperature in a glove box having an oxygen concentration adjusted to no greater than 1.0 ppm, and the mixture was stirred. One hundred milligrams of Mes2B$^+$ [(C$_6$F$_5$)4B]$^-$, or the two-coordinate boron cation salt, was added to the above mixture, and the mixture was stirred for 24 hours at a room temperature. The mixed solution was stirred with the use of a stirrer within a closed vessel. Thereafter, the mixed solution was placed in a closable pressure vessel while being nitrogen-purged in the air, which was then subjected to heat treatment for 10 hours at 200° C. It was confirmed that, by adding the two-coordinate boron cation salt, the dispersiveness of scaly graphite improved dramatically and a layered sp$^2$ carbon-containing composition was formed.

Thereafter, a residue was collected through filtering with pump suction with the use of a Teflon membrane filter having a pore size of 0.1 μm. At the end of the filtering, the filter was washed with orthodichlorobenzene to rinse off any reacted boron cation. Then, after collected through filtering, the residue was dispersed again in orthodichlorobenzene, and centrifugal separation was carried out for 20 minutes at 15000 rpm. Then, an sp$^2$ carbon-containing composition in which a graphene quantum dot was included in the supernatant liquid was obtained.

Example 3

An sp$^2$ carbon-containing composition was obtained through a method similar to that of Example 2 except in that scaly graphite according to Example 2 was changed to carbon black (arithmetic mean particle size of 41 nm).

Example 4

Under argon, 1 mL of dry orthodichlorobenzene was added to 15 mg of scaly graphite (mean particle size of 7 μm) at a room temperature in a glove box having an oxygen concentration adjusted to no greater than 1.0 ppm, and the mixture was stirred. One hundred milligrams of Mes2B$^+$ [(C$_6$F$_5$)4B]$^-$, or the two-coordinate boron cation salt, was added to the above mixture, and the mixture was stirred for 24 hours at a room temperature. The mixture was stirred with the use of a stirrer within a closed vessel. Thereafter, the mixed solution was placed in a closable pressure vessel while being nitrogen-purged in the air, which was then subjected to heat treatment for 10 hours at 200° C. It was confirmed that, by adding the two-coordinate boron cation salt, the dispersiveness of scaly graphite improved dramatically and layered peeled particles were formed.

Figure 8:
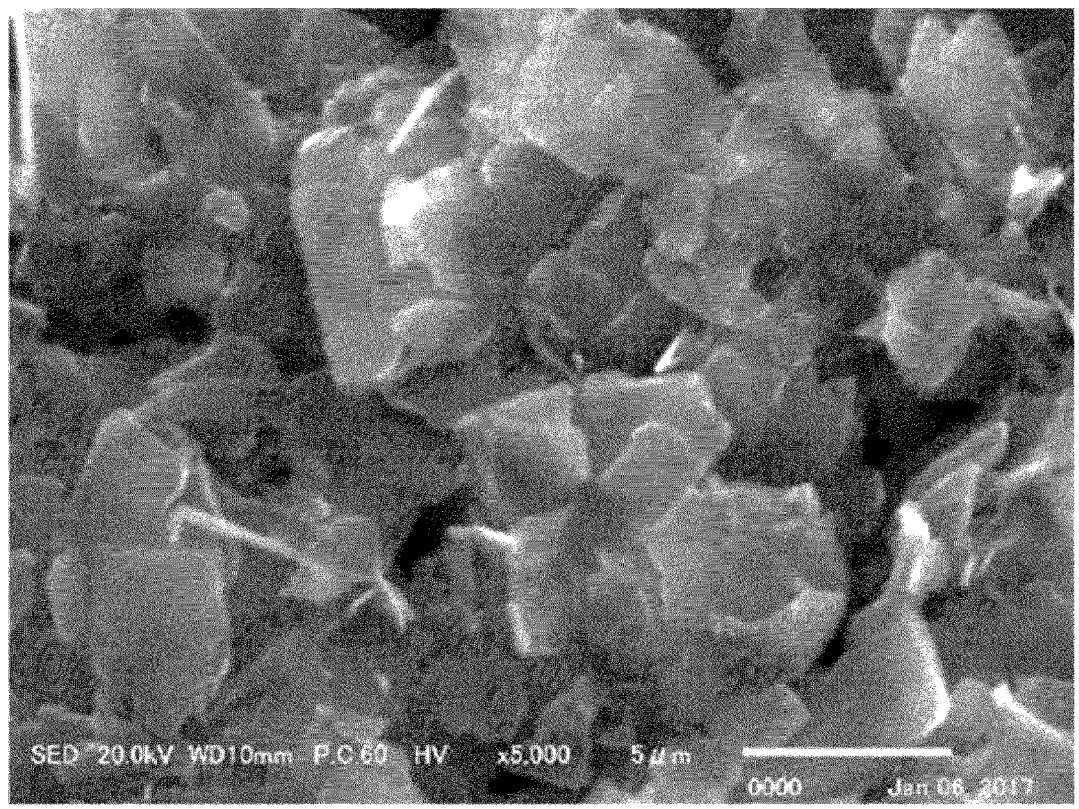
FIG. 8 illustrates an SEM image of an $sp^2$ carbon-containing composition used in Example 4.
Figure 9:
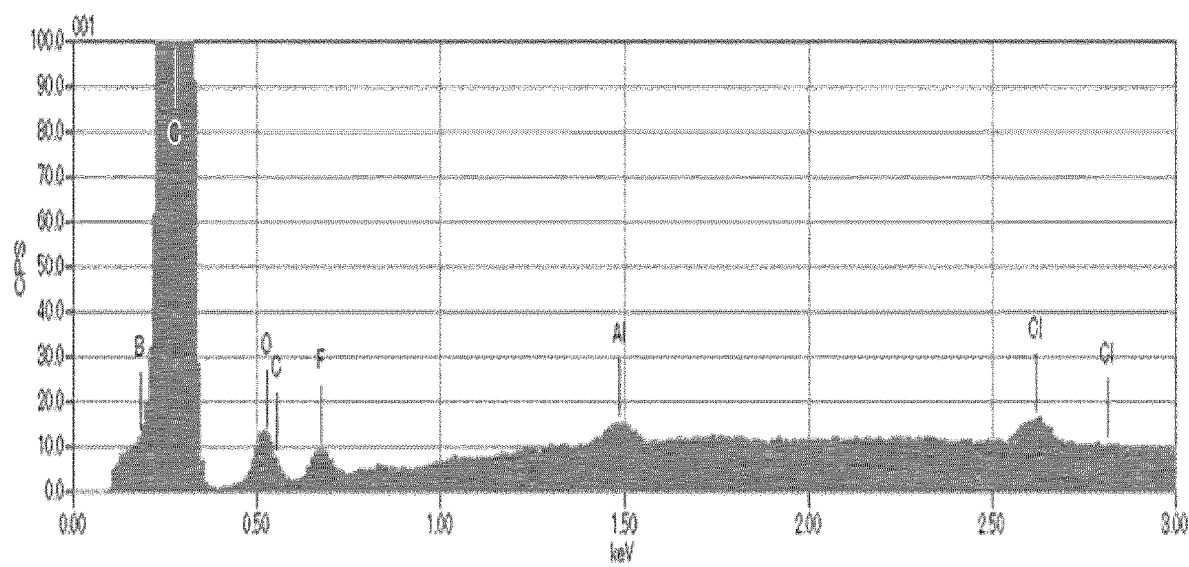
FIG. 9 illustrates an EDX spectrum of an $sp^2$ carbon-containing composition used in Example 4.

Thereafter, a residue was collected through filtering with pump suction with the use of a Teflon membrane filter having a pore size of 0.1 μm. At the end of the filtering, the filter was washed with orthodichlorobenzene to rinse off any reacted boron cation. The collected residue was spread as-is on an SEM sample holder and dried, which was then subjected to scanning electron microscopy (SEM) and energy-dispersive X-ray analysis (EDX), as illustrated in FIG. 8 and FIG. 9.

Example 5

Figure 10:
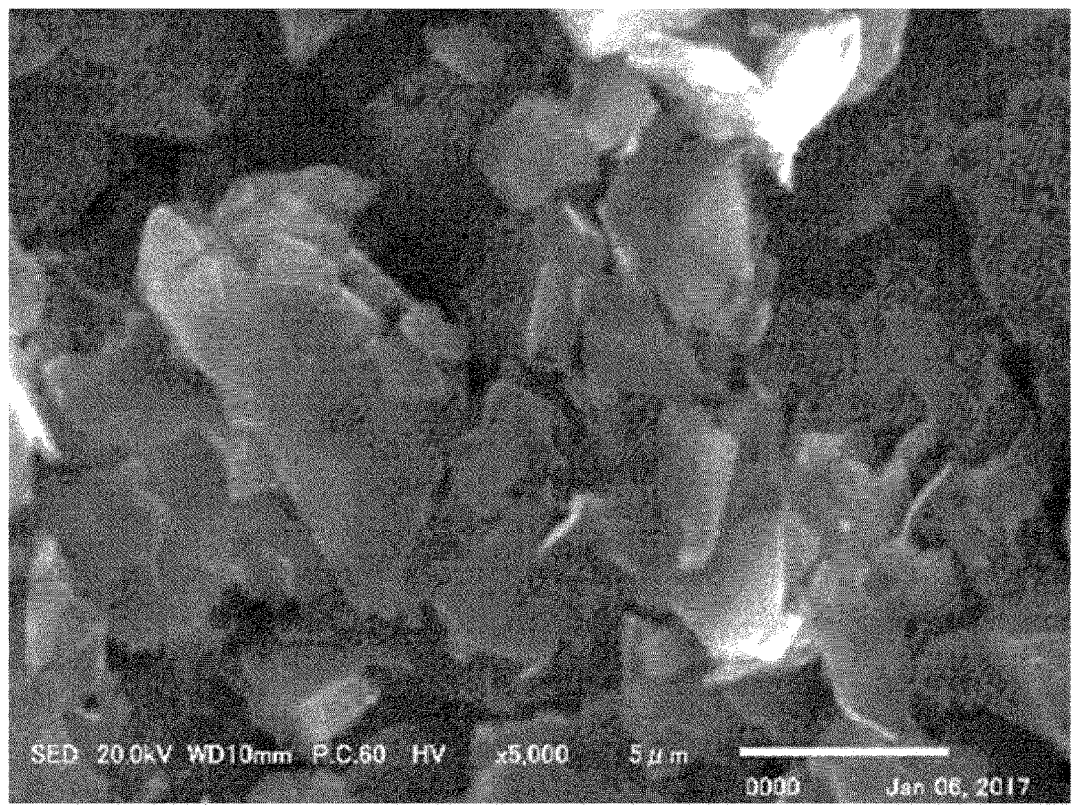
FIG. 10 illustrates an SEM image of an $sp^2$ carbon-containing composition used in Example 5.
Figure 11:
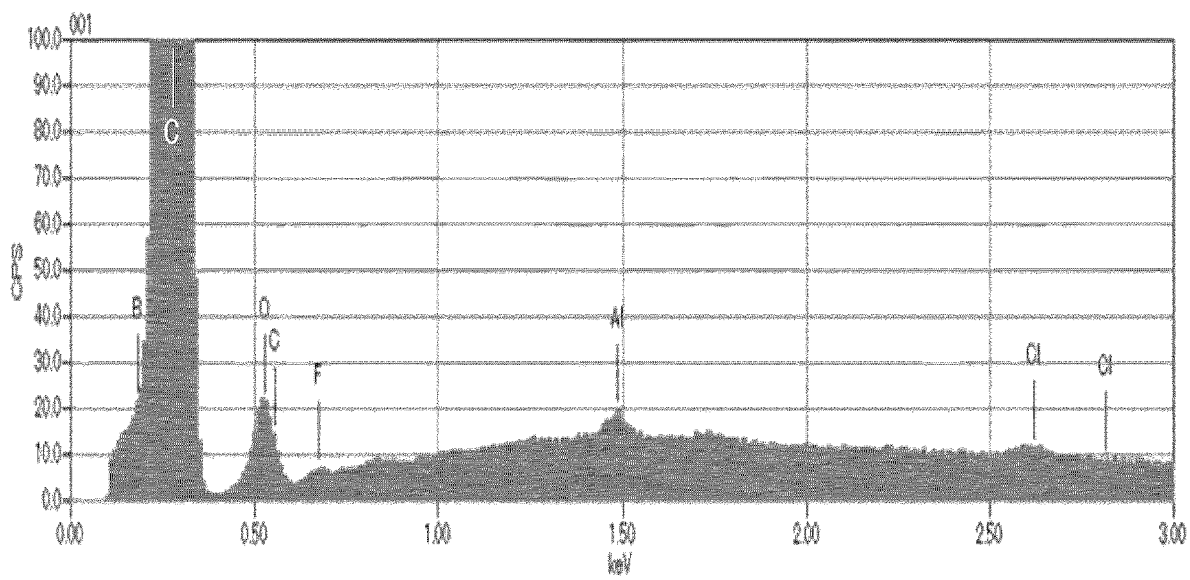
FIG. 11 illustrates an EDX spectrum of an $sp^2$ carbon-containing composition used in Example 5.

An sp$^2$ carbon-containing composition was obtained through a method similar to that of Example 4 except in the following. After the mixed solution was stirred, ultrasonication was carried out with the vessel kept closed (processed for 60 minutes with ultrasonic waves of 28 kHz), in place of the step of placing the mixed solution into a closable pressure vessel while being nitrogen-purged in the air and carrying out heat treatment at 200° C. Thereafter, scanning electron microscope (SEM) and energy-dispersive X-ray analysis (EDX) were carried out, as illustrated in FIG. 10 and FIG. 11.

Example 6

Figure 12:
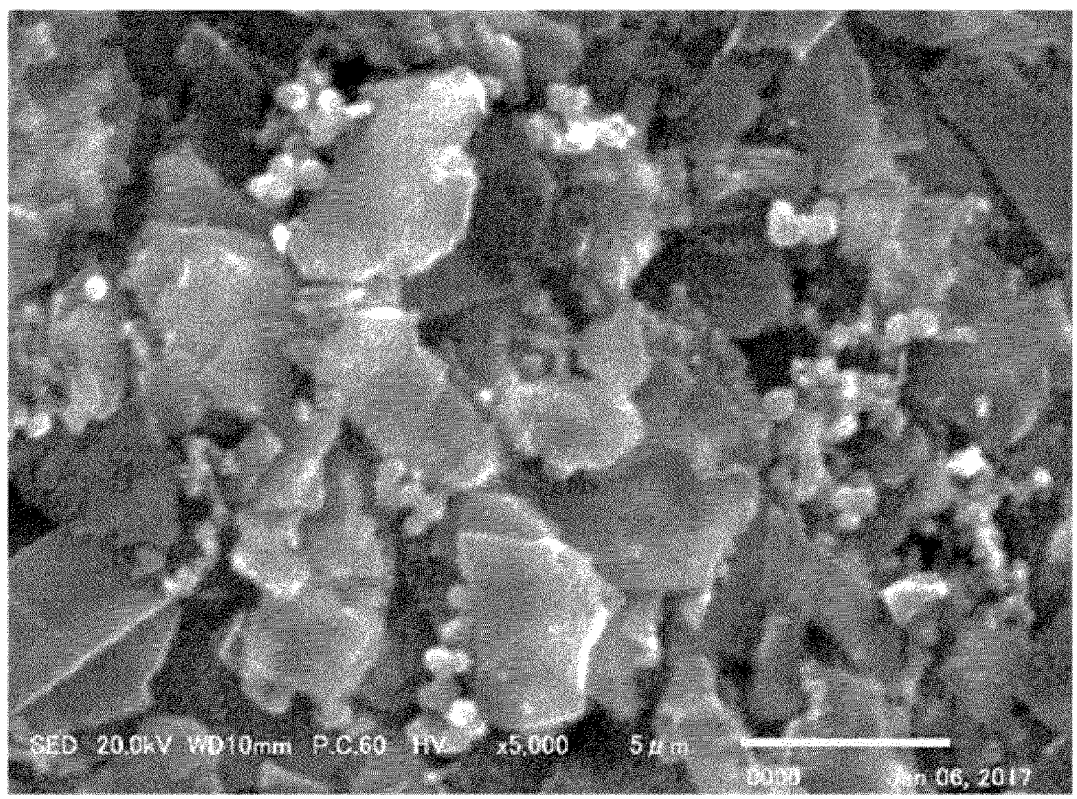
FIG. 12 illustrates an SEM image of an $sp^2$ carbon-containing composition used in Example 6.
Figure 13:
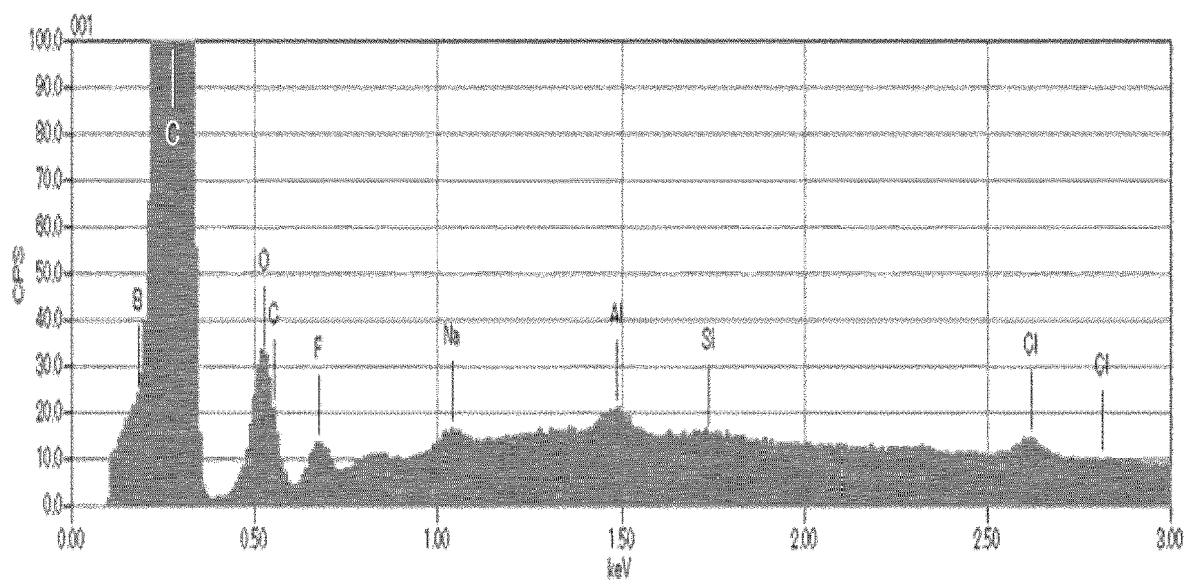
FIG. 13 illustrates an EDX spectrum of an $sp^2$ carbon-containing composition used in Example 6.

An sp$^2$ carbon-containing composition was obtained through a method similar to that of Example 4 except in the following. The mixed solution was placed into a closed vessel suitable for microwaves while being nitrogen-purged in the air and heated for 5 hours with the temperature controlled to 200° C. with microwaves of 50 W to 100 W, in place of the step of placing the mixed solution into a closable pressure vessel while being nitrogen-purged in the air and carrying out heat treatment at 200° C. Thereafter, scanning electron microscope (SEM) and energy-dispersive X-ray analysis (EDX) were carried out, as illustrated in FIG. 12 and FIG. 13.

Example 7

Figure 14:
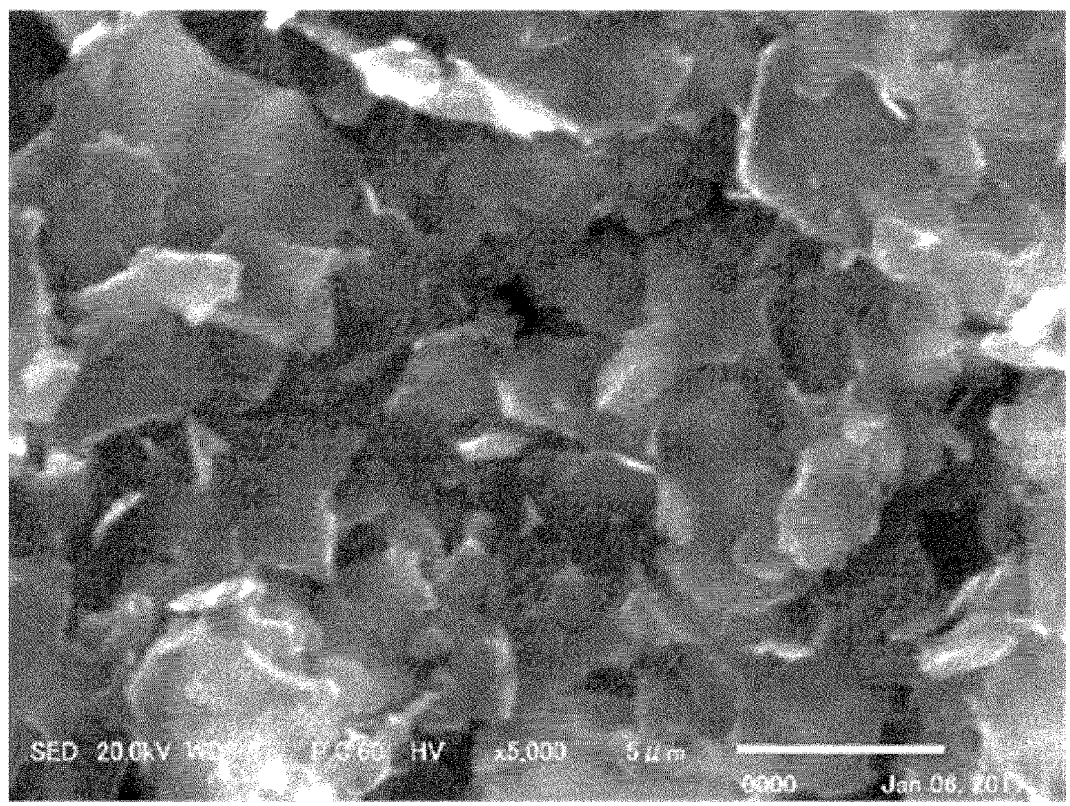
FIG. 14 illustrates an SEM image of an $sp^2$ carbon-containing composition used in Example 7.
Figure 15:
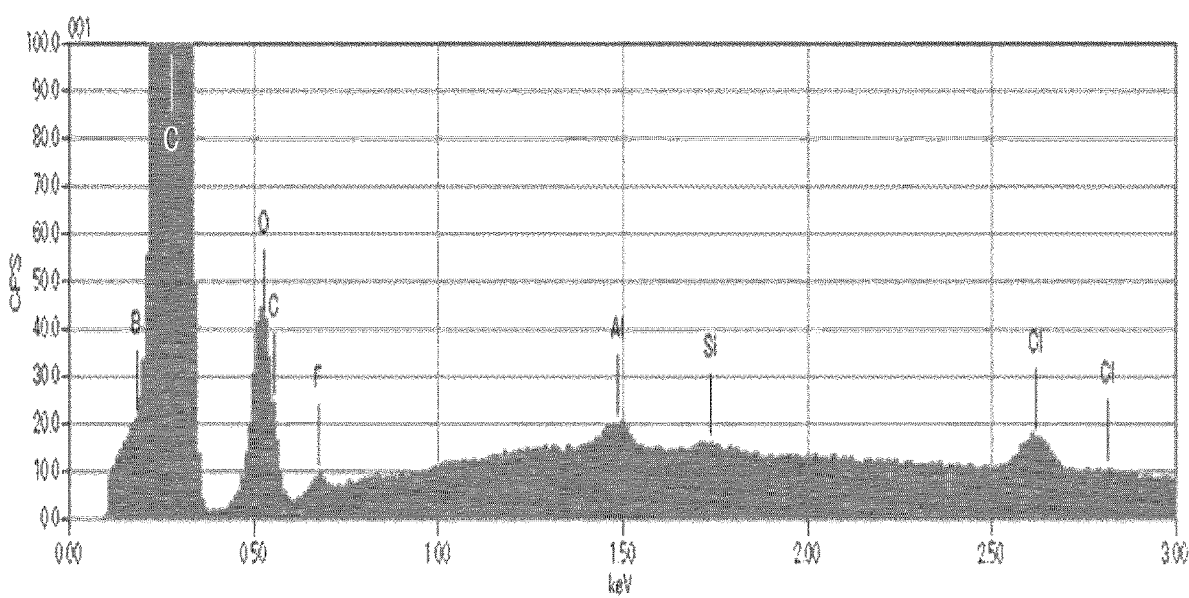
FIG. 15 illustrates an EDX spectrum of an $sp^2$ carbon-containing composition used in Example 7.

An sp$^2$ carbon-containing composition was obtained through a method similar to that of Example 5 except in the following. Fifteen milligrams of synthetic graphite (mean particle size of 6 μm) was used in place of 15 mg of scaly graphite (mean particle size of 7 μm). Thereafter, scanning electron microscope (SEM) and energy-dispersive X-ray analysis (EDX) were carried out, as illustrated in FIG. 14 and FIG. 15.

Comparative Example 1

A process similar to that of Example 4 was carried out without adding the two-coordinate boron cation salt to unprocessed scaly graphite used in Example 4. Observation through SEM revealed no such peeling as observed in Example 4 in the obtained particles. In addition, it was confirmed that the particle size was substantially the same as the particle size of scaly graphite used as a raw material substance.

Comparative Example 2

A process similar to that of Example 5 was carried out without adding the two-coordinate boron cation salt to unprocessed scaly graphite used in Example 4. Observation through SEM revealed some micronization of particles in the obtained particles as compared to the case of scaly graphite used as a raw material substance. However, such peeling as observed in Example 5 was not recognized.

Evaluation Results of Examples 2, 4 to 7

Figure 3:
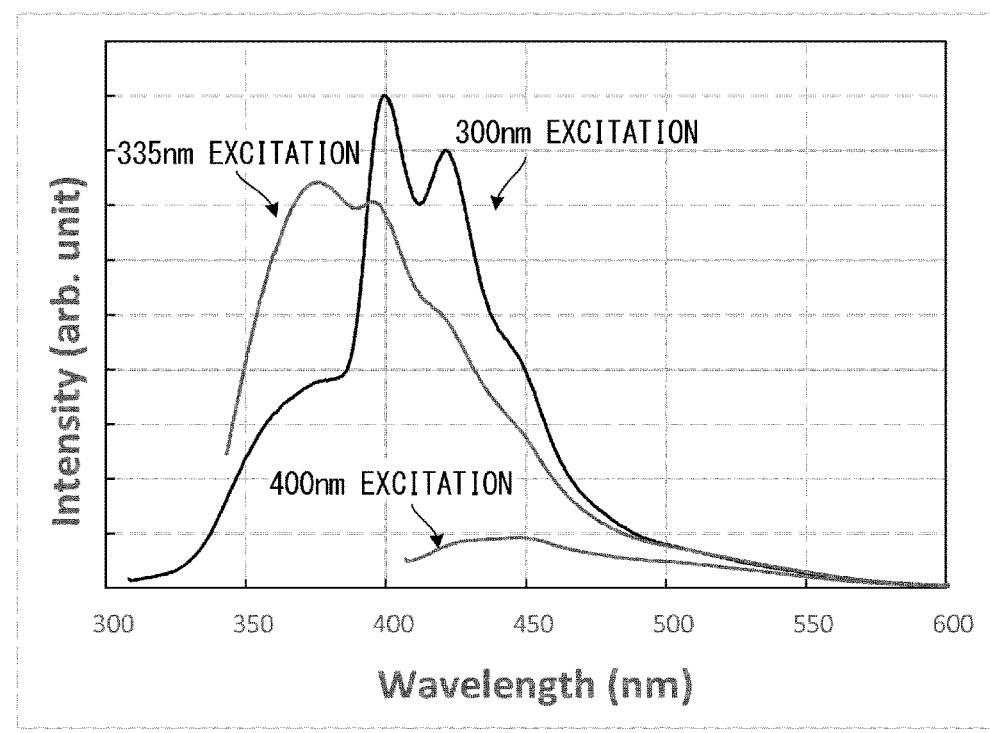
FIG. 3 illustrates an emission spectrum of an $sp^2$ carbon-containing composition according to Example 2.

FIG. 3 illustrates emission spectra of the GQD according to Example 2. As illustrated in FIG. 3, it was confirmed that emission occurred with excitation at 300 nm, 335 nm, and 400 nm. The emission spectrum was measured similarly for scaly graphite used as a raw material substance of the $sp^2$ carbon, but it was confirmed that no emission spectrum was observed at any of the excitation wavelengths.

Figure 4:
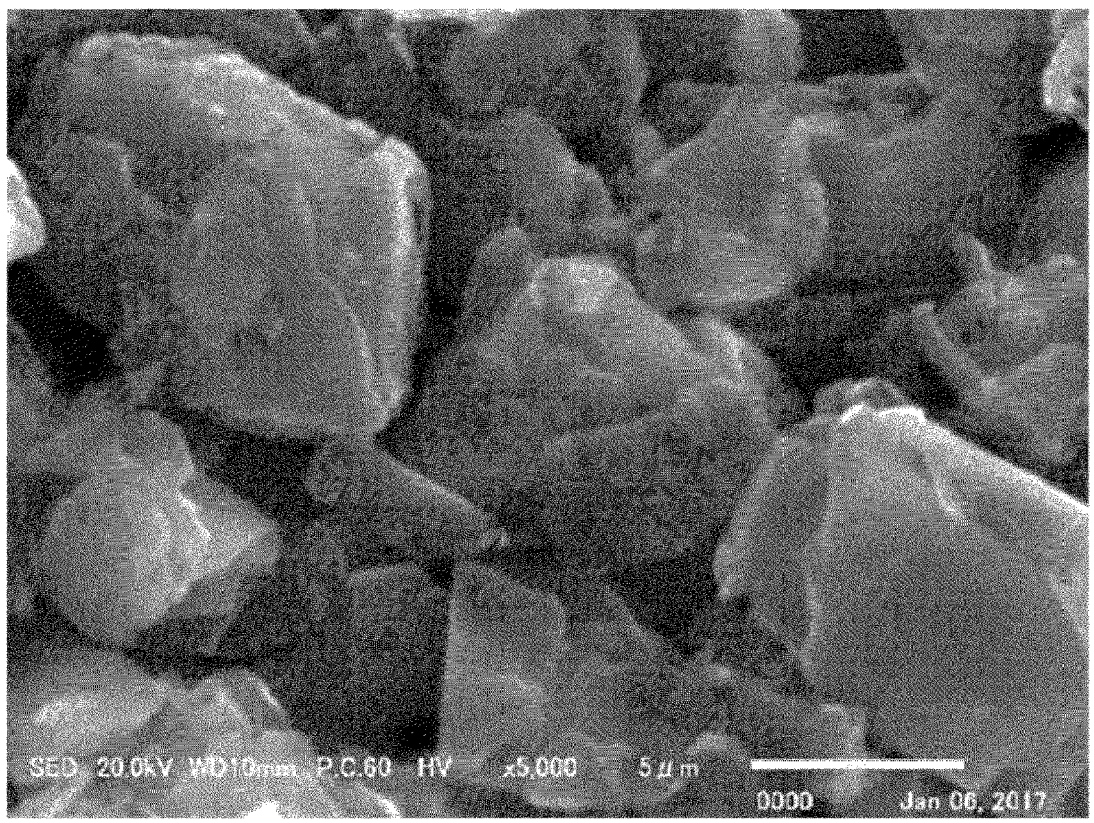
FIG. 4 illustrates an SEM image of scaly graphite ($sp^2$ carbon) used in Example 4 and so on, in which a two-coordinate boron cation salt has not yet been added to the scaly graphite.
Figure 5:
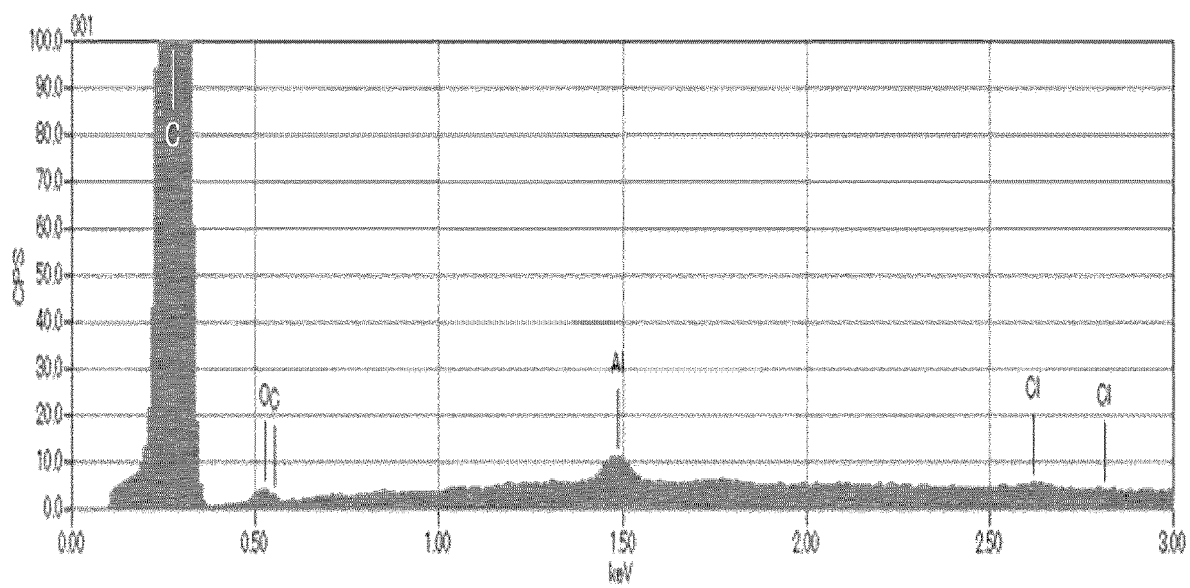
FIG. 5 illustrates an EDX spectrum of scaly graphite ($sp^2$ carbon) used in Example 4 and so on, in which a two-coordinate boron cation salt has not yet been added to the scaly graphite.
Figure 6:
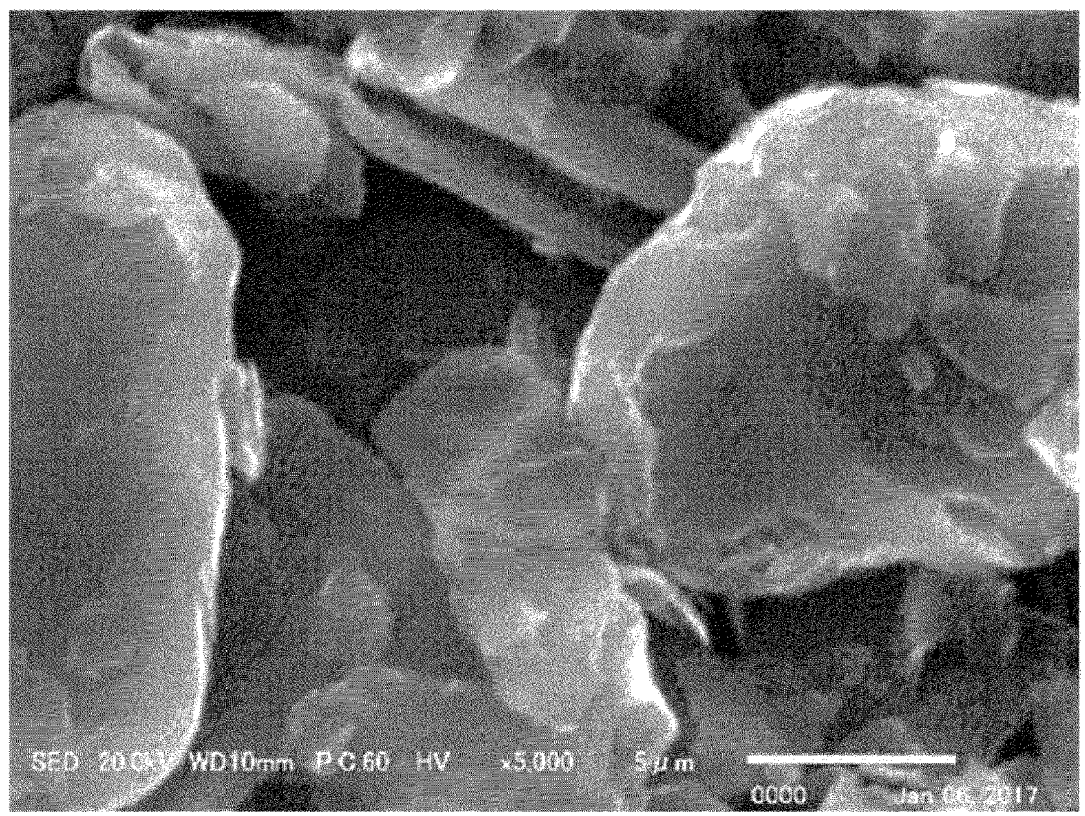
FIG. 6 illustrates an SEM image of synthetic graphite ($sp^2$ carbon) used in Example 7, in which a two-coordinate boron cation salt has not yet been added to the synthetic graphite.
Figure 7:
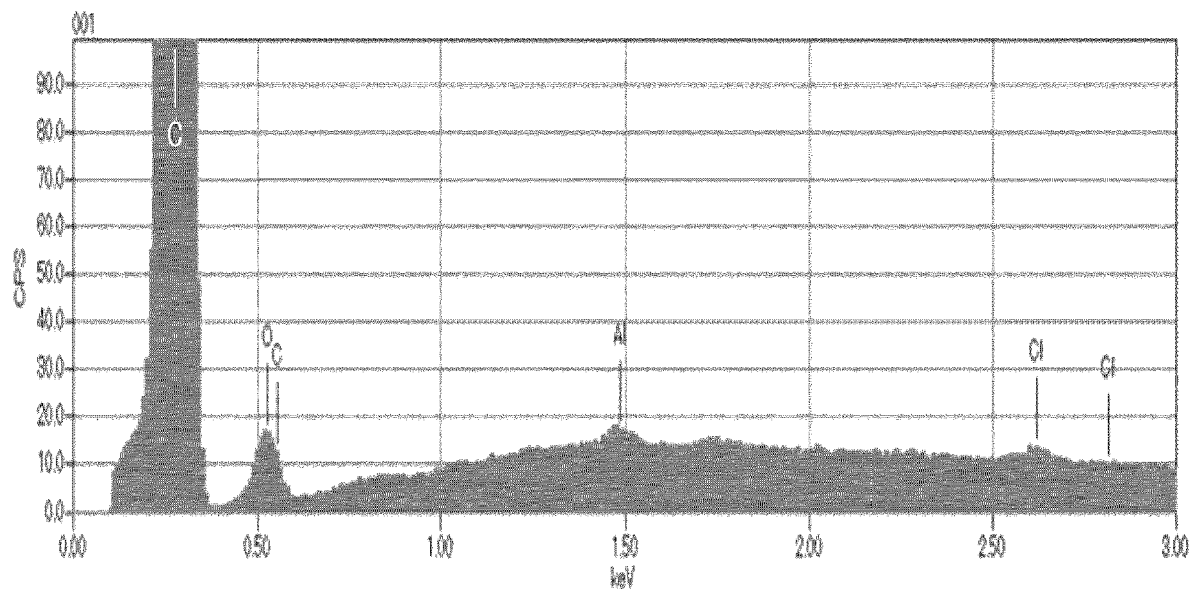
FIG. 7 illustrates an EDX spectrum of synthetic graphite ($sp^2$ carbon) used in Example 7, in which a two-coordinate boron cation salt has not yet been added to the synthetic graphite.

FIG. 4 illustrates an SEM photograph of scaly graphite to which the two-coordinate boron cation salt used in Example 4 has not yet been added, and FIG. 5 illustrates an EDX measurement profile of the scaly graphite. FIG. 6 illustrates an SEM photograph of synthetic graphite to which the two-coordinate boron cation salt used in Example 7 has not yet been added, and FIG. 7 illustrates an EDX measurement profile. FIGS. 8, 10, 12, and 14 illustrate SEM photographs of the $sp^2$ carbon-containing compositions obtained respectively in Examples 4 to 7, and FIGS. 9, 11, 13, and 15 illustrate EDX measurement profiles of the $sp^2$ carbon-containing compositions obtained respectively in Examples 4 to 7.

It was confirmed that a peeled layer was obtained in each of the $sp^2$ carbon-containing compositions illustrated in FIGS. 8, 10, 12, and 14. FIGS. 9, 11, 13 and 15 reveals that an F-unique peak was observed in each of the $sp^2$ carbon-containing compositions and a counter anion was incorporated in each $sp^2$ carbon-containing composition.

This application claims priority to Japanese Patent Application No. 2016-026001, filed on Feb. 15, 2016, and the entire disclosure of which is incorporated herein.

INDUSTRIAL APPLICABILITY

The $sp^2$ carbon-containing composition according to the present disclosure can be used in transparent conductive films, capacitors, electrodes for fuel cells, conductive complexes, solar cells, electrodes for storage batteries, electronic papers, transistors, various sensors, and so on. In addition, the GQD-containing composition serving as one embodiment of the $sp^2$ carbon-containing composition can be used in luminescent materials for highlighters or the like, in addition to the aforementioned use.

The invention claimed is:
1. A method of manufacturing an $sp^2$ carbon-containing composition, the method comprising:
a contact step of bringing an $sp^2$ carbon and a two-coordinate boron cation salt into contact with each other,
wherein the $sp^2$ carbon is at least one of graphene and graphite.

2. The method of manufacturing an sp2 carbon-containing composition according to claim 1, wherein a two-coordinate boron cation of the two-coordinate boron cation salt is expressed by the following general formula (1):

Formula (1)

wherein $R^1$ and $R^2$ are each independently a compound selected from the group consisting of a phenyl group, a mesityl group, 1,5-dimethylphenyl group, 1,3,5-triisopropylphenyl group, 1,5-diisopropylphenyl group, 1,3,5-tris(trifluoromethyl)phenyl group, and 1,5-bis(trifluoromethyl)phenyl group.

3. The method of manufacturing an $sp^2$ carbon-containing composition according to claim 1, wherein
a counter anion of the two-coordinate boron cation salt includes at least one of a fluorine-based anion and a carborane derivative,
the fluorine-based anion is at least one selected from the group consisting of $BF_4^-$, $PF_6^-$, TFSI, tetraphenyl borate, and tetrakis(pentafluorophenyl)borate, and
the carborane derivative is at least one selected from the group consisting of monocarba-closo-dodecaborate ($HCB_{11}H_{11}^-$) and monocarba-closo-undecachlorododecaborate ($HCB_{11}Cl_{11}^-$).

4. The method of manufacturing an $sp^2$ carbon-containing composition according to claim 1, wherein the contact step includes at least one selected from the steps of:
(i) forming, on a substrate, at least one of a layer consisting of the $sp^2$ carbon and a layer including the $sp^2$ carbon and bringing the two-coordinate boron cation salt into contact with the obtained layer;
(ii) mixing the $sp^2$ carbon or a composition including the $sp^2$ carbon with the two-coordinate boron cation salt in a solvent; and
(iii) mixing the $sp^2$ carbon or powder including the $sp^2$ carbon with powder of the two-coordinate boron cation salt.

5. An $sp^2$ carbon-containing composition comprising:
an $sp^2$ carbon; and
a counter anion of a two-coordinate boron cation salt, wherein
the $sp^2$ carbon includes at least one of graphene and graphite,
the counter anion includes at least one of a fluorine-based anion and a carborane derivative,
the fluorine-based anion is at least one selected from the group consisting of $BF_4^-$, $PF_6^-$, TFSI, tetraphenyl borate, and tetrakis(pentafluorophenyl)borate, and
the carborane derivative is at least one selected from the group consisting of monocarba-closo-dodecaborate ($HCB_{11}H_{11}^-$) and monocarba-closo-undecachlorododecaborate ($HCB_{11}Cl_{11}^-$).

6. The $sp^2$ carbon-containing composition according to claim 5, further comprising a resin.

7. The $sp^2$ carbon-containing composition according to claim 5, wherein the $sp^2$ carbon is a lamina-shaped particle.

8. A method of peeling graphite to obtain a graphene-containing composition, the method comprising:
bringing a two-coordinate boron cation salt into contact with graphite.

9. The method of peeling graphite according to claim 8, wherein a two-coordinate boron cation of the two-coordinate boron cation salt is expressed by the following general formula (1):

Formula (1)

wherein R¹ and R² are each independently a compound selected from the group consisting of a phenyl group, a mesityl group, 1,5-dimethylphenyl group, 1,3,5-triisopropylphenyl group, 1,5-diisopropylphenyl group, 1,3,5-tris(trifluoromethyl)phenyl group, and 1,5-bis(trifluoromethyl)phenyl group.

10. The method of peeling graphite according to claim 8, wherein
a counter anion of the two-coordinate boron cation salt includes at least one of a fluorine-based anion and a carborane derivative,
the fluorine-based anion is at least one selected from the group consisting of $BF_4^-$, $PF_6^-$, TFSI, tetraphenyl borate, and tetrakis(pentafluorophenyl)borate, and
the carborane derivative is at least one selected from the group consisting of monocarba-closo-dodecaborate ($HCB_{11}H_{11}^-$) and monocarba-closo-undecachlorododecaborate ($HCB_{11}Cl_{11}^-$).

11. The method of peeling graphite according to claim 8, wherein the contact includes at least one selected from the steps of:
(i) forming, on a substrate, at least one of a layer consisting of the graphite and a layer including the graphite and bringing the two-coordinate boron cation salt into contact with the obtained layer;
(ii) mixing the graphite or a composition including the graphite with the two-coordinate boron cation salt in a solvent; and
(iii) mixing the graphite or powder including the graphite with powder of the two-coordinate boron cation salt.

12. A method of manufacturing a graphene quantum dot-containing composition, the method comprising:
a step of dispersing and mixing a graphite particle and a two-coordinate boron cation salt in a solvent;
a residue-collecting step of collecting a residue through filtering following the step of dispersing; and
a step of redispersing the residue in a solvent to carry out size fractionation following the residue-collecting step.

13. The method of manufacturing a graphene quantum dot-containing composition according to claim 12, wherein a two-coordinate boron cation of the two-coordinate boron cation salt is expressed by the following general formula (1),

[Chem. 3]

$$R^1\text{—}B\text{—}R^2 \qquad \qquad \text{Formula (1)}$$

[In the formula, R¹ and R² are each independently a compound selected from the group consisting of a phenyl group, a mesityl group, 1,5-dimethylphenyl group, 1,3,5-triisopropylphenyl group, 1,5-diisopropylphenyl group, 1,3,5-tris(trifluoromethyl)phenyl group, and 1,5-bis(trifluoromethyl)phenyl group].

14. The method of manufacturing a graphene quantum dot-containing composition according to claim 12, wherein
a counter anion of the two-coordinate boron cation salt includes at least one of a fluorine-based anion and a carborane derivative,
the fluorine-based anion is at least one selected from the group consisting of $BF_4^-$, $PF_6^-$, TFSI, tetraphenyl borate, and tetrakis(pentafluorophenyl)borate, and
the carborane derivative is at least one selected from the group consisting of monocarba-closo-dodecaborate ($HCB_{11}H_{11}^-$) and monocarba-closo-undecachlorododecaborate ($HCB_{11}Cl_{11}^-$).

15. A graphene quantum dot-containing composition comprising:
a graphene quantum dot; and
a counter anion of a two-coordinate boron cation salt, wherein
the counter anion includes at least one of a fluorine-based anion and a carborane derivative,
the fluorine-based anion is at least one selected from the group consisting of $BF_4^-$, $PF_6^-$, TFSI, tetraphenyl borate, and tetrakis(pentafluorophenyl)borate, and
the carborane derivative is at least one selected from the group consisting of monocarba-closo-dodecaborate ($HCB_{11}H_{11}^-$) and monocarba-closo-undecachlorododecaborate ($HCB_{11}Cl_{11}^-$).

16. The graphene quantum dot-containing composition according to claim 15, further comprising a resin.

* * * * *